United States Patent Office.

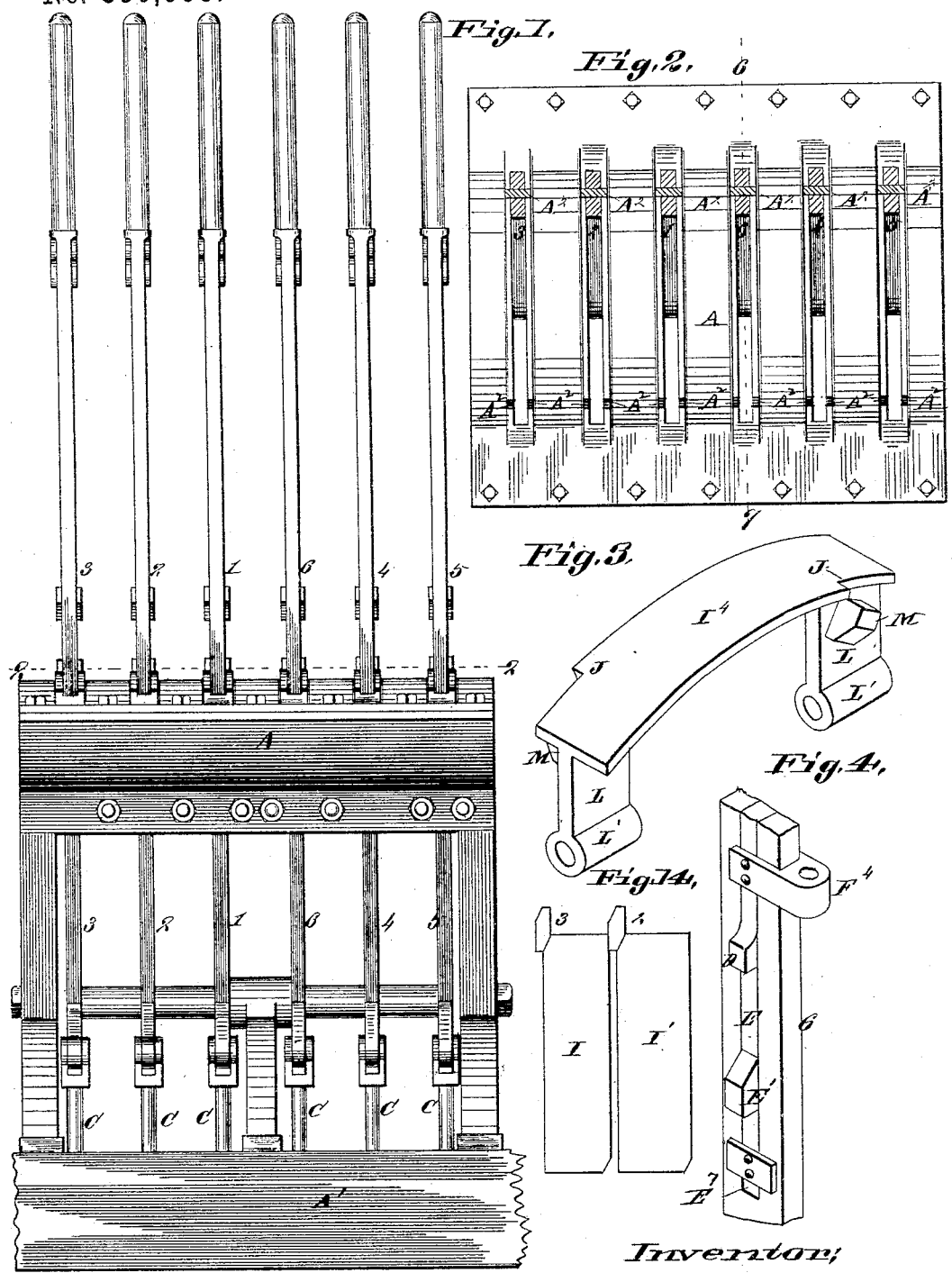

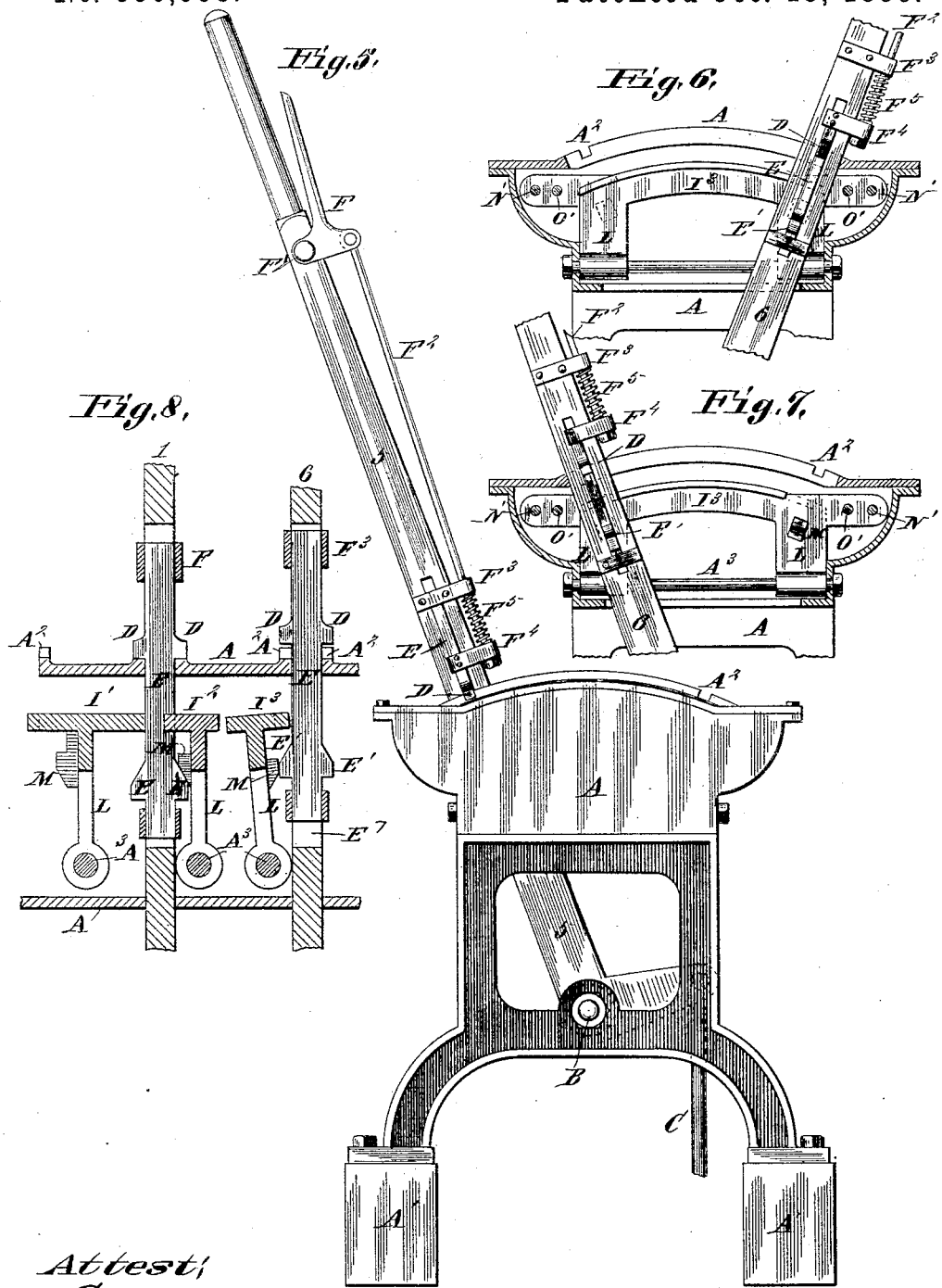

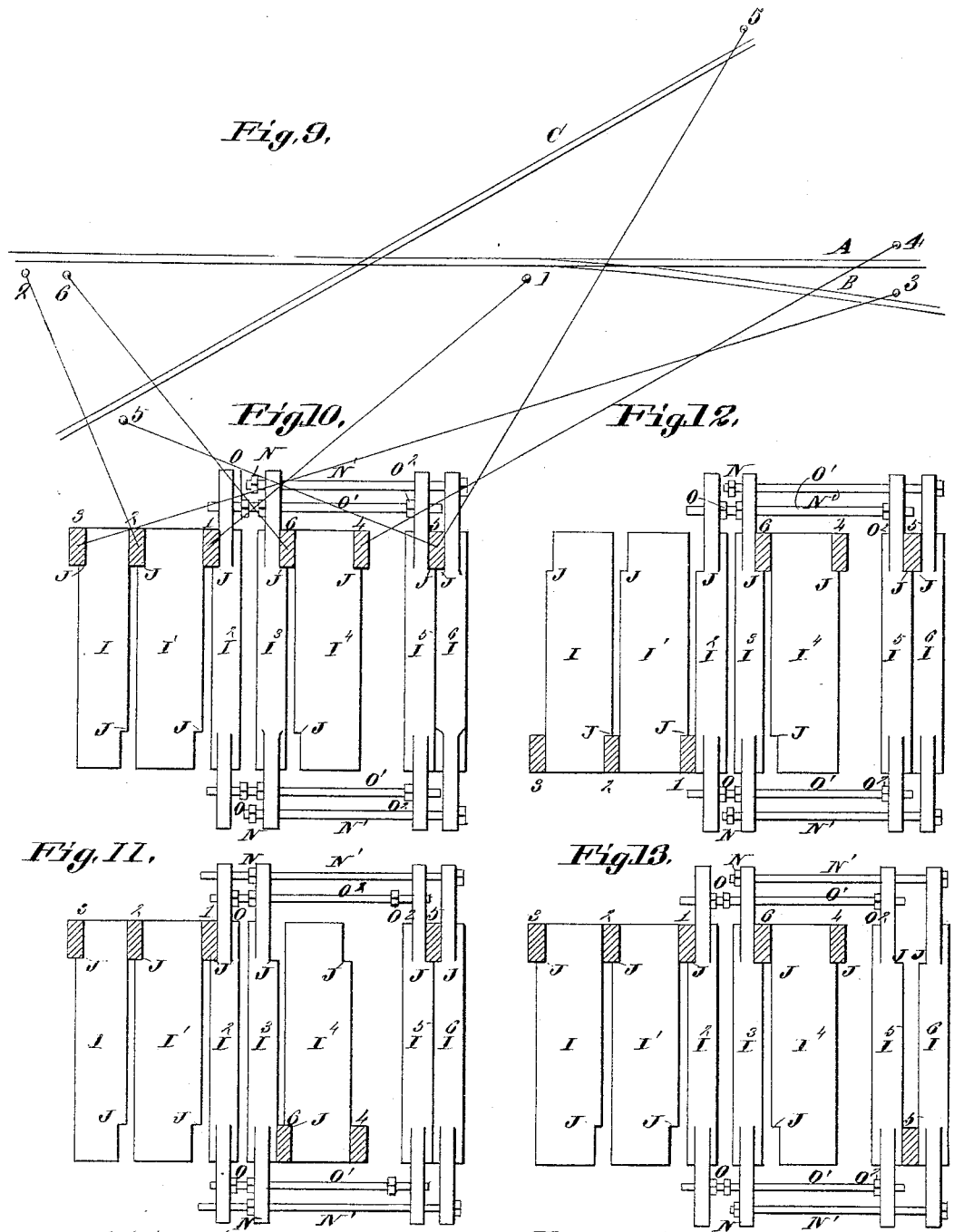

EUGENE J. REMILLON, OF MOBERLY, MISSOURI.

INTERLOCKING SYSTEM.

SPECIFICATION forming part of Letters Patent No. 350,993, dated October 19, 1886.

Application filed May 10, 1886. Serial No. 201,759. (No model.)

*To all whom it may concern:*

Be it known that I, EUGENE J. REMILLON, of Moberly, in the county of Randolph and State of Missouri, have invented a certain new and useful Improvement in Interlocking Systems, of which the following is a full, clear, and exact description, reference being had to the accompanying drawings, forming part of this specification, and in which—

Figure 1 is a rear elevation of my improved system. Fig. 2 is a horizontal transverse section taken on line 2 2, Fig. 1. Fig. 3 is an enlarged perspective view of one of the locking-bars removed. Fig. 4 is an enlarged detail perspective view of one of the levers, showing the lower end of the operating dog or pawl. Fig. 14 is a modification of this lever and pawl. Fig. 5 is a side elevation of my improved system. Figs. 6 and 7 are detail sections through the stand, taken on line 6 7, Fig. 2, Fig. 6 showing the lever, where the section is taken, in one position, and Fig. 7 showing it in the reverse position. Fig. 8 is a detail section taken lengthwise of the stand, showing the manner of back-locking the levers by moving the locking-bars. Figs. 9, 10, 11, 12, and 13 are diagrams illustrating the operation of my improved system.

My invention relates to an improved interlocking system for operating railway switches and signals; and my invention consists in features of novelty hereinafter fully described, and pointed out in the claims.

Referring to the drawings, A represents a stand supported on a suitable base, A'. Through the lower part of this stand passes a shaft or rod, B. On this shaft are pivoted a number of levers, numbered, respectively, 1, 2, 3, 4, 5, and 6, in the order shown in Figs. 10, 11, 12, and 13. These levers have cranks on their lower ends, to which are connected rods C, that connect the levers to their individual switches or signals in the ordinary method. The levers are capable of being moved from the position shown in Fig. 6 to that shown in Fig. 7, and each is held in either position by projections D on a vertical dog or pawl, E, with which each lever is provided, the dog being held in a slot, E'', of the lever, and being operated by means of a latch, F, pivoted at F' to the handle and connected to the dog by means of a rod, F², passing through lugs F³, secured to the handle, and F⁴, secured to the dog.

Surrounding the rod F², between the lugs F³ F⁴, is a spring, F⁵, which acts to hold the projections D into notches A² of the stand, and it will thus be seen that the levers will be held in whichever position they may be placed, and by simply closing the latches F they will be disengaged from the stand A.

Secured to the stand A by rods A³ are locking bars I', I², I³, I⁴, I⁵, and I⁶, which are interposed between the levers, as shown in Figs. 8, 10, 11, 12, and 13. These locking-bars have shoulders J, as shown, which engage the levers in the different positions, as hereinafter described, whereby the levers are locked and unlocked. The locking-bars are of the shape shown most clearly in Fig. 3, and have vertical projections L, with sockets L' on their lower ends to receive the rods A³. It will thus be seen that these locking-bars are free to rock from a vertical to an inclined position, as shown in Fig. 8, and they are thus moved to unlock the levers, as hereinafter described, by means of inclined projections E' on the dogs E, which come against like projections M on the locking-bars. It will thus be seen that when the latch F is operated to disengage the projections of each lever from the notches A², the projections on the dog will move the locking-bars into the position shown on the right-hand side of Fig. 8, thus disengaging the levers from behind the shoulders J of the locking-bars, so that the levers are free to move.

With my arrangement the operation of one lever locks or back-locks another lever, as will be understood when I describe the operation of my improved system, which I will now do by referring to Figs. 10, 11, 12, and 13. The drawings show the interlocking signals 6 and 4, Fig. 9, of track A, signals 2 and 3 on switch 1 of track B, and signals 5 of track C, the latter operating two signals. When the levers are all in their normal position all signals in this case are set at "danger" and switch set for track A, and no train can come through before the way is cleared by the changing of signals, and three levers can be moved—that is, 1, 5, and 6. Assuming that the track A is to be used, the operator raises the spring-catch of lever 6, as described, and this action will lock levers 1 and 5 by moving the bar I⁵ from the position shown in Fig. 10 to that shown in Fig. 11, which will bring the outer ends of the rocking-bar I⁵ against nuts or collars N on rods N', connecting the bar I³ to the bar I⁶ of lever 5; and this moving of the rocking-bar I³, caused by the raising of the latch of lever 6, will cause collars or nuts O on a rod, O′, to come against the bar I², and the lever I is thus held from being moved by the shoulder J on the bar I². The rods O′ pass through the rocking-bars I², I³, and I⁵, having a slight movement through the bars I² I⁵, until the collars O come against the bar I², and similar collars or nuts, O², come against the bar I⁵, when the movement is reversed. Thus it will be seen that when the latch of lever 6 is raised, the moving of rocking-bar I³ holds the locking-bar I² over against the lever 1, and likewise holds the locking-bar I⁶ over against lever 5. These levers are thus locked when the latch of lever 6 is raised. As soon as the latch of lever 6 is raised, the lever can be drawn back from the position shown in Fig. 6 to that shown in Fig. 7, thus throwing its switch or signal. Before it is thrown back, or while it is in its normal position, it will be seen that lever 4 will be locked, as its bar I⁴ cannot be moved over to relieve the lever 4 from behind the shoulder J. When the lever 6 has been thrown back to the position shown in Fig. 7, it will be seen that it will come opposite the portion which is cut away to form the shoulder J of the rear end of locking-bar I⁴, and the bar is then free to be moved over, allowing lever 4 to be operated. When lever 6 is thus brought to this position (displaying the safety-signal on the track A) only lever 4 can be operated, the remainder of the levers being locked, and as soon as the latch of lever 4 is raised No. 6 will be back-locked by the shoulder J of locking-bar I⁴ engaging it, as shown in Fig. 11, and both the signals of track A are therefore at "safety," and those of tracks B and C at "danger," the lever 4 being moved to the position shown in Fig. 11. To take the levers back to their normal position, No. 4 must come back first, and then No. 6 can be brought back, previously locking No. 4, as it will be neceesary to move the bar 14 to the position shown in Fig. 10 before lever 6 can be removed from behind the shoulder J of the locking-bar 14. When at the end of its stroke, this lever 6 will unlock Nos. 1 and 5, and again the three levers, 1, 5, and 6, are free. What I have just described is the first combination. The second combination is when the track B is to be used. The lever 1 will then be brought forward, previously locking 5 and 6, through means of the rods O′ and its collars, already described, and consequently the bar I⁴ and lever 4. When lever 1 is at the end of its stroke, No. 2 can be operated by moving the locking-bar I′ from the position shown in Fig. 11 to that shown in Fig. 12, and this movement of the bar I′ will back-lock No. 1, which will be engaged behind the shoulder J of the locking-bar I′. When No. 2 is at the end of its stroke, No. 3 can be moved, previously back-locking No. 2 by throwing the shoulder J of the locking-bar I in front of lever No. 2. The signal now stands at "safety" for track B and at "danger" for the other two tracks. The levers can then be brought to their normal position from the position shown in Fig. 12 to that shown in Fig. 10, it being necessary, of course, to bring them back in the reverse order to which they were first operated—No. 3 first, 2 next, and 1 last. This ends the second combination. The third combination is made when the track C is to be used. Then lever 5 will be operated, previously locking 1, 2, 3, 4, and 6, as shown in Fig. 13, through means of the rods O′ N′ and their collars, as already described in relation to the first combination. The signals of the track C are now at "safety," and those of the other tracks are at "danger." When lever 5 is brought back to its normal position from the position shown in Fig. 13 to that shown in Fig. 10, the levers 1 and 6 will again be released. It will thus be seen that with my improved system the combination described can be produced, and by adding additional levers, locking-bars, and rods other combinations may also be produced.

As a modification of the dog E with the projections E′ and inclined projections M on the locking-bars, the levers may have two of their corners beveled off, as shown in Fig. 14, and the corresponding edges of the locking-bars may be beveled off, as shown in this figure, when the movement of the levers would be prevented without the movement of the locking-bars first taking place, which could not be done until the proper time, as described in my preferred form, and when the levers are operated the inclines would cause the movement of the locking-bars.

I claim as my invention—

1. In an interlocking system, the combination, with the operating-levers, of the oscillating locking-bars notched, substantially as described, and bearing against adjacent faces of two of said levers, and the sliding blocks secured to said levers for moving said locking-bars, substantially as set forth.

2. The combination, with the levers 6 and 4, of the locking-bar I³, engaging the lever 6, for holding it normally at "danger," means for moving said locking-bar when said lever is to be moved to "safety," the locking-bar I⁴ held by the lever 6 against movement until the said lever is moved to "safety," the lever 4 held against movement by the locking-bar I⁴, and means for moving said locking-bar when said lever is free to move, substantially as set forth.

3. In an interlocking system, the combination of the levers 1, 2, 3, 4, 5, and 6, movable locking-bars, and connecting rods N′ O′, provided with collars, substantially as shown and described, for the purpose set forth.

EUGENE J. REMILLON.

In presence of—
JOHN W. NUTE,
E. F. MAY.